US011884088B2

(12) United States Patent

Casey et al.

(10) Patent No.: US 11,884,088 B2

(45) Date of Patent: Jan. 30, 2024

(54) SYSTEM AND METHOD FOR PRINTING DOCUMENTS WITH TEXTURE

(71) Applicant: Xerox Corporation, Norwalk, CT (US)

(72) Inventors: Joseph F. Casey, Webster, NY (US); Christopher D. Atwood, Webster, NY (US); Joseph M. Ferrara, Jr., Webster, NY (US); Frank B. Tamarez Gomez, Webster, NY (US); Jacob McCarthy, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 17/331,262

(22) Filed: May 26, 2021

(65) Prior Publication Data

US 2022/0379643 A1 Dec. 1, 2022

(51) Int. Cl.

| | |
|---|---|
| ***B41M 5/00*** | (2006.01) |
| ***B41J 2/145*** | (2006.01) |
| ***B41M 7/00*** | (2006.01) |
| ***B41J 13/00*** | (2006.01) |
| ***B41J 11/00*** | (2006.01) |

(52) U.S. Cl.

CPC ............ *B41M 5/0023* (2013.01); *B41J 2/145* (2013.01); *B41J 11/00214* (2021.01); *B41J 13/0009* (2013.01); *B41M 7/009* (2013.01); *B41M 7/0081* (2013.01)

(58) Field of Classification Search

CPC . B41J 11/00214; B41J 11/0015; B41J 11/002; B41J 11/0022; B41J 11/00216; B41J 11/0021; B41J 2/01; B41M 5/0047; B41M 7/0081; C09D 11/101

See application file for complete search history.

(56) References Cited

U.S. PATENT DOCUMENTS

| | | | | |
|---|---|---|---|---|
| 8,287,081 | B2 | 10/2012 | Larson et al. | |
| 8,973,915 | B2 * | 3/2015 | Hendle | B65H 29/042 271/85 |
| 9,403,383 | B1 * | 8/2016 | Liu | B41J 11/00214 |
| 9,764,564 | B2 * | 9/2017 | Grigore | B41M 7/0081 |
| 10,093,108 | B1 | 10/2018 | Giacobbi et al. | |
| 10,277,756 | B2 | 4/2019 | Spence et al. | |
| 2003/0043246 | A1 * | 3/2003 | Codos | B41J 2/01 347/102 |
| 2004/0100512 | A1 * | 5/2004 | Codos | B41M 7/0081 347/8 |
| 2004/0189773 | A1 * | 9/2004 | Masumi | B41J 11/00242 347/102 |
| 2009/0207223 | A1 * | 8/2009 | Cofler | B41J 11/00218 118/620 |

(Continued)

*Primary Examiner* — John Zimmermann

(74) *Attorney, Agent, or Firm* — Maginot Moore & Beck LLP

(57) ABSTRACT

An aqueous inkjet printer also ejects drops of UV material on an aqueous ink image and exposes the aqueous ink image and the UV material to UV radiation before passing the aqueous ink image and UV material through a thermal dryer. The exposure to UV radiation pins the UV material to the aqueous ink image and underlying substrate and the thermal dryer fixes the aqueous ink image to the substrate while releasing free radicals from the UV material. Thus, the printer produces textured prints that do not have free radicals that can irritate skin or produce noxious odors.

11 Claims, 2 Drawing Sheets

(56) References Cited

U.S. PATENT DOCUMENTS

| | | | | |
|---|---|---|---|---|
| 2010/0220162 | A1* | 9/2010 | Schierholz | B41J 3/407 347/102 |
| 2013/0027484 | A1* | 1/2013 | Fukui | B41J 11/00214 347/93 |
| 2013/0050376 | A1* | 2/2013 | Houjou | B41J 11/0022 347/104 |
| 2013/0052432 | A1* | 2/2013 | Koebel | B41M 5/0047 358/1.18 |
| 2013/0176369 | A1* | 7/2013 | Gotou | B41M 5/0023 347/100 |
| 2015/0201491 | A1* | 7/2015 | Tatsuta | B33Y 80/00 361/748 |
| 2015/0247044 | A1* | 9/2015 | Brandstein | C09D 11/101 347/20 |
| 2015/0343796 | A1* | 12/2015 | Ohnishi | B41J 11/00214 347/102 |
| 2015/0344249 | A1* | 12/2015 | Inoue | B65H 9/00 271/3.21 |
| 2018/0281462 | A1 | 10/2018 | Herrmann et al. | |
| 2020/0094581 | A1* | 3/2020 | Ohnishi | B41J 11/0021 |
| 2020/0122484 | A1 | 4/2020 | Campbell et al. | |
| 2021/0031542 | A1* | 2/2021 | Kamihara | B41J 3/60 |
| 2021/0197584 | A1* | 7/2021 | Asada | B41J 29/377 |
| 2021/0221149 | A1* | 7/2021 | Nakamura | B41J 11/00214 |

* cited by examiner

SYSTEM AND METHOD FOR PRINTING DOCUMENTS WITH TEXTURE

TECHNICAL FIELD

This disclosure is directed to inkjet printers and, more particularly, to printing textures on documents with such printers.

BACKGROUND

Inkjet imaging devices, such as inkjet printers, are well known. These printers eject liquid ink from printheads to form images on an image receiving surface. The printheads include a plurality of inkjets that are arranged in some type of array. Each inkjet has a thermal or piezoelectric actuator that is coupled to a printhead controller. The printhead controller generates firing signals that correspond to digital data for images. The actuators in the printheads respond to the firing signals by ejecting ink drops onto an image receiving member and form an ink image that corresponds to the digital image used to generate the firing signals.

Textured printing is preferred for some forms of documents. For example, business cards, placards, and invitations are typically printed with raised or coated characters or graphics. The raised characters and graphics as well as the gloss and variable reflections made possible by textured printed are frequently perceived as being more aesthetically pleasing than non-textured printing.

Aqueous inkjet printers employ water-based or solvent-based inks in which pigments or other colorants are suspended or in solution. These inks have the advantage of being non-toxic and are generally without odors. Also, the vibrancy of the colors produced by aqueous inks make them useful for fine art printing. Once an aqueous ink is ejected onto an image receiving surface by a printhead, the water or solvent is evaporated to stabilize the ink image on the image receiving surface. When aqueous ink is ejected directly onto media, the aqueous ink tends to soak into the media and, when the media is porous, such as paper, the water in the ink changes the physical properties of the media. Because the spread of the ink droplets striking the media is a function of the media surface properties and porosity, the print quality can be inconsistent. Additionally, because aqueous inks tend to be absorbed by some media, they are not conducive for building up layers that are useful for textured printing. Being able to use aqueous ink in textured printing would be beneficial.

SUMMARY

A new inkjet printer combines aqueous ink and UV curable inks to produce textured printing. The printer includes a media transport configured to move media through the printer, at least one actuator operatively connected to the media transport, the at least one actuator being configured to operate the media transport to move the media through the printer, at least two printheads, each printhead having a plurality of ejectors and at least one printhead is configured to eject drops of an aqueous ink toward the media moving through the printer and at least one other printhead is configured to eject drops of a UV curable material toward the media after the drops of aqueous ink have landed on the media, a UV curing device configured to direct UV radiation toward the media passing through the printer after the media has passed the at least two printheads, and a thermal dryer configured to direct energy toward the media passing through the printer after the media has passed the UV curing device.

A method of operating the new inkjet printer produces textured printing using aqueous ink. The method includes operating at least one actuator operatively connected to a media transport to move media through the printer, operating at least one printhead having a plurality of ejectors to eject drops of an aqueous ink toward the media moving through the printer, operating at least one other printhead having a plurality of ejectors to eject drops of a UV curable material toward the media after the drops of aqueous ink have landed on the media, operating a UV curing device to direct UV radiation toward the media passing through the printer after the media has passed the printheads, and operating a thermal dryer to direct energy toward the media passing through the printer after the media has passed the UV curing device.

BRIEF DESCRIPTION OF THE DRAWINGS

The foregoing aspects and other features of an inkjet printer and method of its method of operation that produces textured printing using aqueous and UV curable inks are explained in the following description, taken in connection with the accompanying drawings.

DETAILED DESCRIPTION

Figure 1:
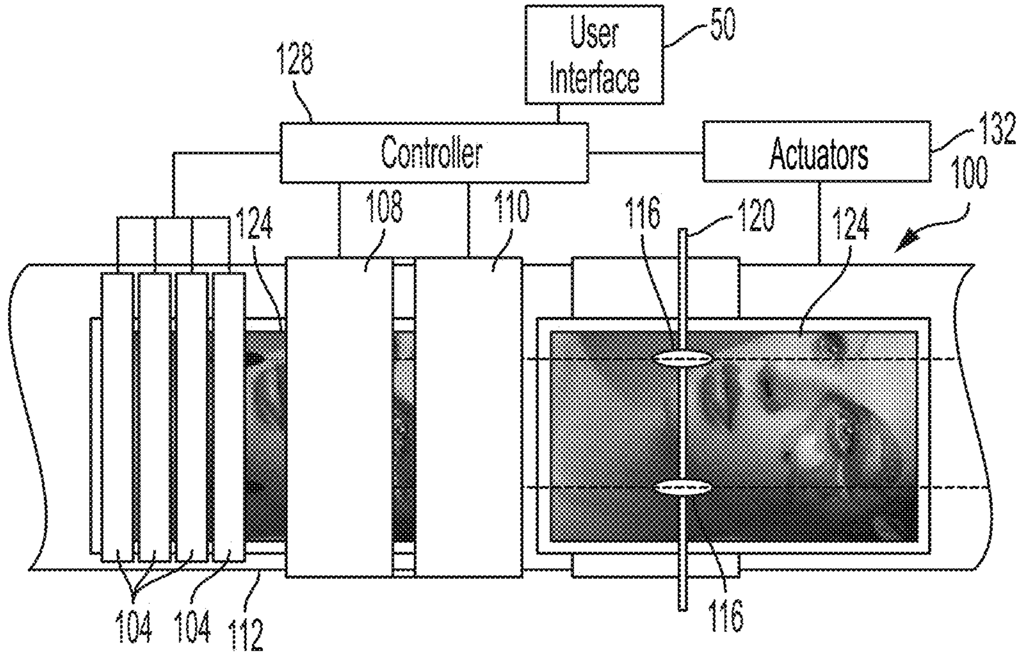
FIG. 1 depicts an inkjet printer configured to produce textured printing using aqueous and UV curable inks.

For a general understanding of the inkjet printer disclosed herein and its use as well as the details for the printer and its use, reference is made to the drawings. In the drawings, like reference numerals designate like elements.

As used herein, the terms “printer,” “printing device,” or “imaging device” generally refer to a device that produces an image on print media with marking materials, such as ink, and may encompass any such apparatus, such as a digital copier, bookmaking machine, facsimile machine, multi-function machine, or the like. Image data generally includes information in electronic form that is rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. The term “textured printing” means printed images that have raised features or coatings that enhance the underlying image. The term “aqueous inks” means marking materials that have a high percentage of water or solvent relative to the amount of colorant dissolved or suspended in the liquid in the ink.

FIG. 1 depicts a block diagram of an aqueous inkjet printer 100 that is configured to produce textured printing using aqueous ink and UV curable inks. The printer 100 includes at least two arrays 104 of printheads, although the depicted printer has four such arrays, a UV curing device 108, a thermal heater 110, a media transport 112, a pair of nip rollers 116 mounted about a member 120 that extends in a cross-process direction across the media 124 carried by the media transport 112, one or more actuators to drive the media transport 112, and a controller 128 that is configured to operate the components of the printer 100. While the system 100 shown in FIG. 1 uses a single thermal dryer, multiple thermal dryers and an extension of the transport belt can be provided. As used in this document, the term "thermal dryer" refers to a configuration of drying components that can be operated to treat a printed substrate with heat to evaporate water or other solvents from a printed image. The words "dry" and "drying" as used in this document means using a form of energy to evaporate a liquid or a solvent that can be directed along a predetermined path.

In FIG. 1, the media transport 112 is implemented with an endless belt wrapped about two or more rollers, at least one of which is driven by one of the actuators 132 to rotate the belt about the rollers. Other embodiments can be used for the media transport 112, such as a series of rotating nip rollers driven by one or more of the actuators 132. In some embodiments, a leading end of a supply roll of media is fed through the printer to a take-up roll at the end of the printer. The support member on which either the supply roll, the take-up roll, or both are driven to move media from the supply roll to the take-up roll in a known manner. As used in this document, the term "media" means individual substrates of image receiving surfaces and a continuous substrate of image receiving surface. As used in this document, the term "cross-process direction" refers to the direction perpendicular to the direction of substrate movement past the printheads, the curing device, and the thermal dryer that also lies in the plane of the substrate. The term "process direction" as used in this document refers to the direction of substrate movement past the printheads, the curing device, and the thermal dryer that also lies in the plane of the substrate.

The printhead arrays 104 are configured and operated in a known manner to eject drops of aqueous ink onto the media passing by them to form ink images on the media. The UV curing device 108 is configured to expose an image containing UV curable inks to electromagnetic radiation within a frequency range that at least partially cures the UV curable inks. In some embodiments, the UV curing device is a single radiator that emits a radiation pattern that is as wide in the cross-process direction as the widest media printed by the printer. In other embodiments, the UV curing device is comprised of a plurality of UV light radiators that are arranged in an array having a width in the cross-process direction that equals the widest media printed by the printer. In these embodiments, the controller 128 can selectively activate the radiators in the array of the UV curing device 108 to expose areas printed with UV ink to the radiation without using energy to illuminate the non-UV ink areas. The thermal dryer(s) 110 heat the media uniformly to a temperature that is sufficient to remove enough of the water from the aqueous ink in printed images that the aqueous ink adheres to the media and that removes free radicals in the partially cured UV inks.

In previously known aqueous inkjet printers used for textured printing, the aqueous ink image is thermally treated first to adhere the image to the substrate. After the thermal treatment, the aqueous ink image passes by a printhead that ejects UV curable ink or coating material on top of the affixed aqueous ink image. The UV curable ink or coating material is then exposed to the curing radiation. This process, however, is subject to oxygen inhibition of the curing process. This oxygen inhibition can result in only a partially curing of the UV material. Because UV materials contain free radicals, the partially cured images can irritate the skin of people removing the printed media and offensive odors can permeate the environment surrounding the printer.

To address these issues, the printhead arrays 104 are configured with different sources of material for ejection. For example, in one embodiment, four printhead arrays can be configured with different colors of aqueous inks such as cyan, yellow, magenta, and black, and a fifth printhead array is configured to eject UV curable material. The printhead arrays configured with the aqueous inks are positioned to eject the aqueous inks on the media before the printhead array(s) configured with the UV curable material eject drops of the UV curable material on the aqueous images on the media. The controller 128 uses image data for a print job to operate the printheads in the printhead arrays 104 so drops of aqueous ink are ejected onto the media before the drops of a UV curable ink or coating material are ejected onto the aqueous images to provide texture to the printed images. The combination aqueous ink/UV curable material image is then exposed to a UV curing radiation first to pin the UV curable material to the aqueous ink image and the substrate. As used in this document, the term "pining" means exposing UV curable material to an amount of UV radiation that is sufficient to cure the UV material only partially. The partially cured UV material remains in place to preserve the textured effect in the printed image. The subsequent thermal drying of the combined aqueous ink/UV curable material image both fixes the aqueous ink on the substrate and removes the free radicals from the UV curable material. The result is textured printing that is safer and less odious than previously known textured prints using UV curable materials.

In one embodiment, the thermal dryer 110 is configured with infrared radiators that direct infrared radiation toward the entire area of the passing media. In another embodiment, microwave radiators are configured to direct microwave radiation toward the media. In these embodiments that use infrared or microwave radiators, the radiators can be arranged in the dryer 110 in an array as described above with reference to the UV curing device so the controller 128 can selectively operate the radiators to vary the amount of radiation illuminating different areas of the composite printed image. The variation in the intensity is made by the controller using the coverage areas in the image derived from the image data used to operate the printheads and the media types used in a print job. Since the type of media affects the absorption rate of the inks, areas receiving less radiation can absorb more ink than areas more intensely radiated. In other embodiments, one or more convection heaters or heating lamps can be used and the heated air produced by the heater is directed by a blower, fan, or other source of positive air flow toward the passing media. These embodiments are not as facile in altering the amount of heat applied to the composite image as the embodiments having an array of radiators that can be selectively activated. In all of the embodiments of the printer, the controller 128 is configured with programmed instructions stored in a memory operatively connected to the controller that when executed cause the controller to operate the actuators 132 and alter the speed at which the media moves through the curing device 108 and the dryer 110. By slowing the media, exposure to the UV radiation can be delayed so more time is provided for the absorption of ink into the media. This absorption alters the heights of the inks on the media and the corresponding textures produced on the media. Additionally, slowing the media speed through the UV curing device and the dryer increases the exposure to radiation and heat, respectively, to remove free radicals from the media.

Figure 2:
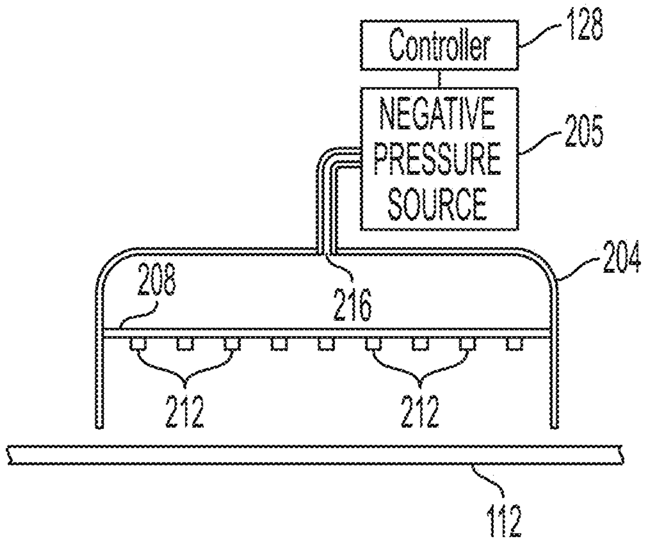
FIG. 2 is a side view of a configuration of the UV curing device or the thermal dryer used in the printer of FIG. 1.

A side view of one embodiment of a thermal dryer 110 that can be used in the printer of FIG. 1 is shown in FIG. 2. The thermal dryer 110 includes a housing 204, a plurality of members 208, and drying elements 212 mounted to the members 208. The housing 204 encloses a volume of air and has an opening that communicates with the space adjacent to the media as they pass through the housing 204. The members 208 depicted in the figure extend across the housing 204 in the cross-process direction, although the members could extend in the process direction provided the members are not separated from one another by a distance that is greater than the width of the area heated by each of the drying elements 212. This type of member/heating element configuration ensures the entire or most of the entire surface area of the passing media are heated. This same type of configuration can be used for the UV radiators arranged in the array in the UV curing device as described previously. As noted above, the drying elements can be infrared radiators, microwave radiators, heat lamps, convection heaters, air blowers, and the like. For embodiments of the drying elements implemented with heat lamps or convection heaters, a source of pressurized air can be included to direct the heat produced by the drying elements toward the media. Housing 204 can also include a vent opening 216 and a source of negative pressure 205 can be connected to the vent opening to pull evaporated water, solvents, and free radicals from the air within the volume of the housing 204. The housing 204 helps hold heated or dry air generated by the drying elements to dry the ink image and release the free radicals from the UV curable ink.

Operation and control of the various subsystems, components and functions of the printer 100 are performed with the aid of a controller 128. The controller 128 is operatively connected to the components of the printhead modules 104 (and thus the printheads), the UV curing device 108, the thermal dryer 110, and the actuators 132 that rotate the media transport 112 and the nip rollers 116. The controller 128, for example, is a self-contained, dedicated minicomputer having a central processor unit (CPU) with electronic data storage, and a display or user interface (UI) 50. The controller 128, for example, includes a sensor input and control circuit as well as a pixel placement and control circuit. In addition, the CPU reads, captures, prepares, and manages the image data flow between image input sources, such as a scanning system or an online or a work station connection, and the printhead modules 34A-34D. As such, the controller 128 is the main multi-tasking processor for operating and controlling all of the other machine subsystems and functions in the printing system 100. To perform these operations, the controller 128 using print job data, such as media type, ink types, and the like, along with the image data used to operate the printing performed by the printheads.

The controller 128 can be implemented with general or specialized programmable processors that execute programmed instructions. The instructions and data required to perform the programmed functions are stored in the memories operatively connected to the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Figure 3:
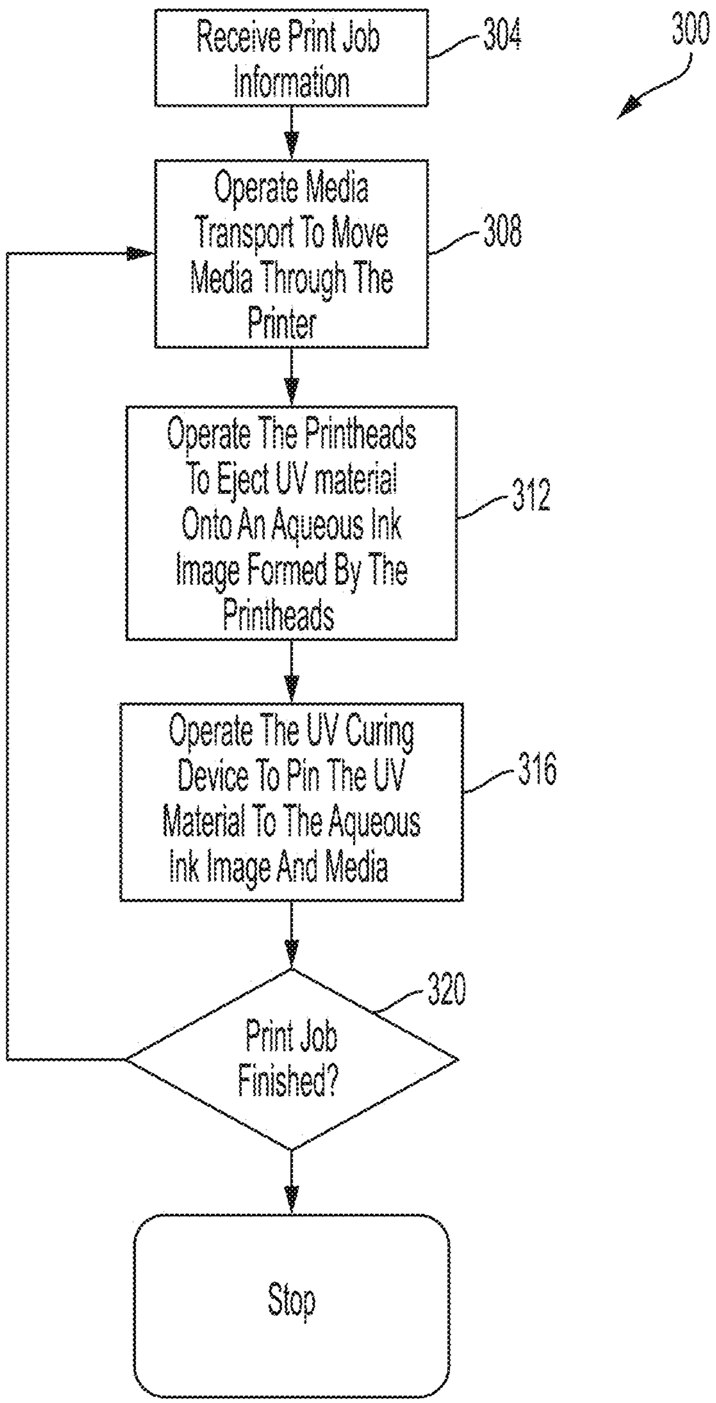
FIG. 3 is a flow diagram of a process for operating the system of FIG. 1.

A process for operating the system 100 to print textured printed images on media is shown in FIG. 3. The process is performed by controller 128 executing programmed instructions stored in a memory operatively connected to the controller or controllers and when the controller or controllers execute the instructions, they process data and operate components operatively connected to the controllers to perform the tasks set forth in the flow diagram of the process.

The process 300 begins by receiving print job information such as the media types, ink types, and image data to be used to operate the printheads to eject the drops of aqueous ink and the drops of the UV curable material in a pattern corresponding to the image data (block 304). The media transport is started to pass media through the printer (block 308) and the printheads are operated to form aqueous ink images on the media and then eject drops of the UV curable material onto the aqueous image in a pattern corresponding to image data for the textured pattern received in the print job data (block 312). The UV curing device is operated to pin the UV material patterns to the aqueous images and media (block 316). The thermal dryer and the actuators of the media transport are operated to affix the aqueous images to the media and to remove the free radicals from the UV materials on the aqueous ink images and the media (block 320). Operation of the thermal dryer includes operating the negative pressure source to pull evaporated water, solvents, and released free radicals from the thermal dryer so they can be safely vented outside the environment of the printer. Additionally, operation of the thermal dryer includes using the image data of the aqueous ink images and UV curable material patterns to activate and deactivate the radiators in the UV during device and the drying elements in the thermal dryer selectively. When the print job is completed (block 324), the process stops.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:

a media transport configured to move media through the printer in a process direction;

at least one actuator operatively connected to the media transport, the at least one actuator being configured to operate the media transport to move the media through the printer in the process direction;

at least two printhead arrays arranged to follow one another in the process direction, each printhead in each of the at least two printhead arrays having a plurality of ejectors and at least one printhead array is configured to eject drops of an aqueous ink toward the media moving through the printer and at least one other printhead array is configured to eject drops of a UV curable material toward the media after the drops of aqueous ink have landed on the media;

a UV curing device configured to direct UV radiation toward the media passing through the printer after the media has passed the at least two printhead arrays, the UV curing device having a housing with a width that extends in a cross-process direction across a distance that corresponds to a widest width of media that can be printed by the printer, a plurality of members extending across the housing, and a plurality of UV radiators mounted to each member in the plurality of members extending across the housing, each UV radiator being configured to direct UV radiation toward the media being moved by the media transport through the housing of the UV curing device in the process direction;

a thermal dryer configured to direct energy toward the media passing by the thermal dryer in the process direction after the media has passed the UV curing device, thermal dryer including a housing having a plurality of members extending across the housing of the thermal dryer, an opening, a source of negative pressure connected to the opening in the housing to pull evaporated liquid and free radicals from the thermal dryer, and a plurality of drying elements mounted to each member in the plurality of members extending across the housing of the thermal dryer, each drying element being configured to direct energy toward the media passing through the housing of the thermal dryer; and a controller operatively connected to the at least two printhead arrays, the at least one actuator, the UV curing device, the source of negative pressure, and the thermal dryer, the controller being configured to:

operate the least one actuator to operate the media transport to move media through the printer in the process direction;

use image data to operate the ejectors in the at least two printhead arrays to eject drops of aqueous ink and drops of UV material toward the media passing through the printer;

using the image data to operate the UV radiators in the UV curing device selectively to pin the UV material to aqueous ink as the media passes through the housing of the UV curing device in the process direction;

operate the thermal dryer to evaporate liquid from the aqueous ink on the media as the media passes the thermal drying in the process direction and to release free radicals from the UV material after the UV material has been pinned to the aqueous ink; and operate the source of negative pressure to pull the evaporated liquid and free radicals through the opening in the housing.

2. The printer of claim 1 wherein the plurality of members extend in a process direction within the housing of the thermal dryer.

3. The printer of claim 1 wherein the plurality of members extend in a cross-process direction within the housing of the thermal dryer.

4. The printer of claim 3 wherein the drying elements are microwave radiators.

5. The printer of claim 3 wherein the drying elements are infrared radiators.

6. The printer of claim 3 wherein the drying elements are convection heaters.

7. The printer of claim 1 wherein the plurality of members extend in a process direction within the housing of the UV curing device.

8. The printer of claim 1 wherein the plurality of members extend in a cross-process direction within the housing of the UV curing device.

9. The printer of claim 1, the controller being further configured to:

operate the at least one actuator of the media transport to slow entry of the media into the UV curing device.

10. The printer of claim 9, the controller being further configured to:

operate the at least one actuator of the media transport to slow passage of the media through the UV curing device.

11. The printer of claim 10, the controller being further configured to:

operate the at least one actuator of the media transport using the image data and data corresponding to a type of the media being moved by the media transport.

* * * * *